United States Patent
Dareing

[15] 3,693,365
[45] Sept. 26, 1972

[54] SUBMARINE PIPELINE FOR FLUID TRANSPORTATION

[72] Inventor: Donald W. Dareing, Fayetteville, Ark.

[73] Assignee: Cities Service Oil Company

[22] Filed: May 11, 1970

[21] Appl. No.: 36,242

[52] U.S. Cl. ............................61/72.1, 61/43, 61/46, 61/72.3, 138/178
[51] Int. Cl. ..............................................F16l 10/00
[58] Field of Search............61/72.1, 72.3, 72.4, 1, 7, 61/39, 30, 43, 46; 138/178, 111, 112

[56] References Cited

UNITED STATES PATENTS

| | | | |
|---|---|---|---|
| 3,467,013 | 9/1969 | Conner | 61/72.3 X |
| 2,383,840 | 8/1945 | Benckert | 114/0.5 X |
| 2,848,389 | 8/1958 | Bjorksten | 61/12 X |

FOREIGN PATENTS OR APPLICATIONS 984,183  1965  Great Britain..............61/72.1

Primary Examiner—Jacob Shapiro
Attorney—J. Richard Geaman

[57] ABSTRACT

An inflatable flexible shrouding is affixed to the sea floor by means for weighting the pipeline, such as a metal plate or concrete anchor, to form a submarine pipeline. Under adverse weather conditions the flexible shrouding may be evacuated and collapsed, thus reducing the chances of damage to the pipeline. The composition of the flexible shrouding eliminates corrosion and resists the abrasive effect of ocean floor movement. Pipeline flexibility facilitates the shrouding to be spooled on land and unspooled at sea, appreciably reducing transportation and construction costs.

7 Claims, 2 Drawing Figures

PATENTED SEP 26 1972  3,693,365
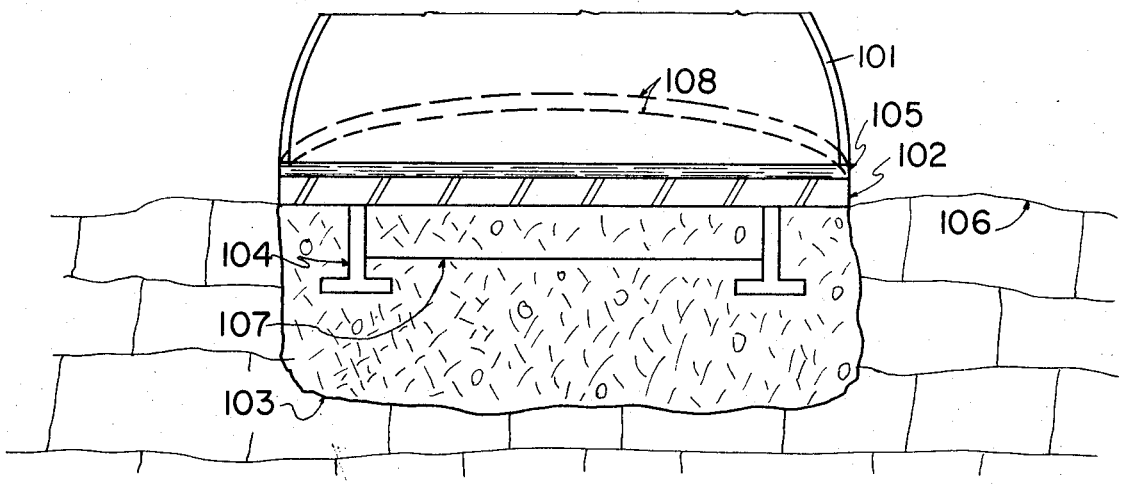
Fig I
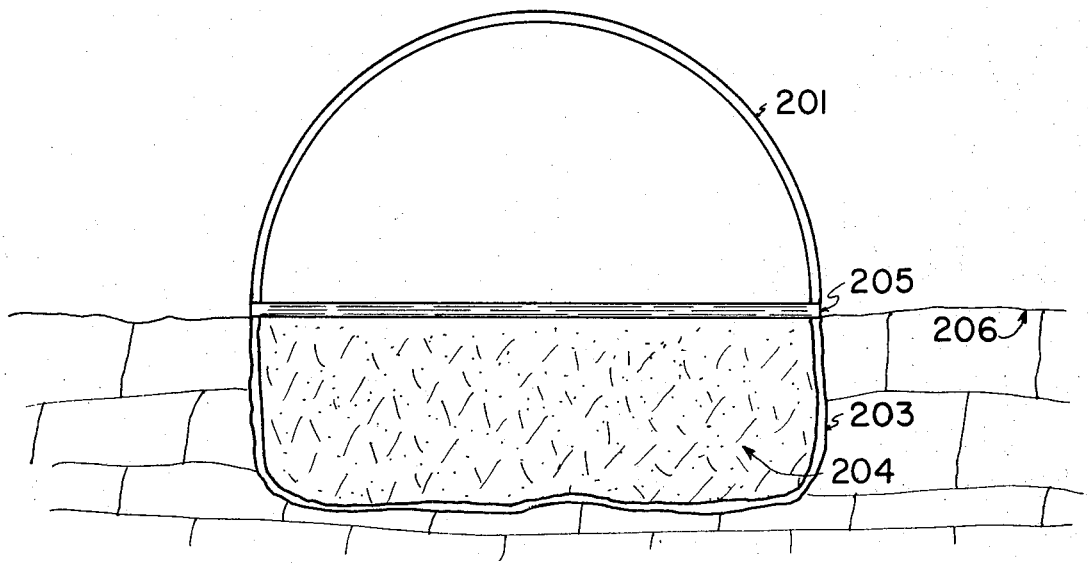
Fig II
DONALD W. DAREING, INVENTOR.
BY J. Richard Geaman

SUBMARINE PIPELINE FOR FLUID TRANSPORTATION

BACKGROUND OF THE INVENTION

Recent discoveries of offshore oil and gas have developed a need to provide adequate facilities for the conveying of natural gas, crude oil and refined products in remote locations and in particular at extreme water depths. This requirement, coupled with the increased demand for adequate marine disposal and sewage facilities, has made the construction of submarine pipelines which are both durable, flexible and easily constructed a necessity.

Most techniques for the laying of submarine pipelines have the common characteristic that the pipelines are constructed at a remote position from where they are to be rested. Conventional pipelines are formed by a joining procedure, usually called the "stovepipe" method of construction. Sections of circular steel pipe are welded together, the welds being made either on shore or on a barge and the pipeline then encased in cement or some other corrosive inhibiting-antibuoyant material and lowered to the sea's floor. The handling and movement of the pipeline from its construction location to the sea bed involves considerable stressing of the pipeline. To avoid pipeline failure, it is a primary design criteria that the pipeline be both flexible and durable for both the construction and the working life of the pipeline.

Due to the relative inflexibility of a steel circular pipeline, the steel pipelines are usually buried in the ocean floor so as not to be subjected to severe ocean currents and floor movement. Two common methods of burying a pipeline exist: one being by a dredging method where a bucket and cutter or suction dredgers are used to form a trench in the ocean floor; the second method is that of plowing where a trough plow is used to form a trench in the ocean floor and the pipeline is subsequently lowered into the plowed area.

Several features effect the design of a submarine pipeline. One feature is its ability to resist the forces of nature such as waves, tidal currents, and sea bed movement. The ability of the submarine pipeline to withstand the stresses through construction and the use to which it will be subjected also must be determined. Lastly, the method of construction and of pipeline securing to be employed and the feasibility of the same must be considered. The most popular method used to secure a submarine pipeline against the forces of nature is that of dredging or plowing. The submarine pipeline is placed below the ocean surface and is not subjected to the moving ocean bottom and the turbulence normally associated with offshore installations. The ability of the pipeline to resist the construction and use stresses is, however, a more severe problem which can only be overcome by utilizing high strength steels or high strength steels coated with cement or other materials such as resins, epoxies, plastics and fiberglass materials. The methods of construction generally are very time consuming and most expensive from an economic standpoint. The methods of construction are cumbersome and require great expenditures of equipment, labor, and time. In addition, the twisting forces of the ocean floor, coupled with the permanent stresses from the construction of the pipeline may result in pipeline failure. Normally, two or more pipeline assemblies are set in the same trench so that if one pipeline fails the fluid may be switched to another pipeline for continued conveyance, while the original pipeline utilized may be repaired.

A further construction criteria which must be considered is the weight of the pipeline. The pipeline must not exhibit buoyancy or a tendency to float. Therefore, pipeline material must have negative buoyancy to withstand the ocean pressure upon the pipeline. In the transportation of crude oil, gas pockets often form within the pipeline and represent a stringent deterrent to pipeline usage. This effect is amplified in the conveyance of natural gas or other gases through the pipeline Under either condition, there may develop the problem of the buoyant forces overcoming the weight of the pipeline and tending to make the pipeline float. Several inches or more of concrete may be necessitated on the outside of the circular steel pipeline in order that the pipeline be able to overcome the buoyancy of the fluid contained therein. Anchors placed at intervals along the pipeline are also utilized to inhibit pipeline flotation and movement.

To be considered in the design of a pipeline is the corrosiveness of sea waters upon pipelines. The steel and aluminum varieties are especially troublesome. Methods used to provide corrosive inhibitance include the coating of the pipeline on the exterior and interior with fiberglass materials or epoxy resins which must be applied after the pipeline is welded. Therefore, either a method of in situ corrosion inhibitor film formation or a method for applying the inhibitant layer to the pipeline before it is laid, must be developed. Naturally, these techniques are most expensive and hinder the construction time required for laying the submarine pipeline. As the need arises, the steel pipes carrying gas, oil and other products may require highly sophisticated lining materials. Other materials for pipeline construction include plastic pipes, fiberglass pipes, aluminum and prestressed concrete pipes which contain a network of steel rods or steel mat therein. None of the materials available offers an attractive solution to the problem.

What is required is a submarine pipeline which is both flexible to resist the natural forces of the seas, noncorrosive to resist the corrosive tendencies of brine of brackish waters and which has a fluctuating capacity to allow the flow of different rates of materials and volumes of materials therethrough. The pipeline must also exhibit a negative buoyancy so that the pipeline will not tend to flow and will remain permanently positioned to give continuous performance.

It is an object of the present invention to provide a submarine pipeline for the offshore transportation of fluids.

It is another object of the present invention to provide a submarine pipeline which is both corrosion resistant to offshore conditions and will exhibit a flexible volume for the transportation of varied fluid volumes.

It is another object of the invention to provide a submarine pipeline which will resist the natural forces of the sea and will remain permanently positioned throughout its usage.

It is still a further object of the present invention to provide a submarine pipeline which may be easily constructed and placed on the sea floor by continuous construction means.

With these and other objects in mind, the invention is hereinafter set forth in detail, as related by the discussion and drawings presented herein.

SUMMARY OF THE INVENTION

The objects of the present invention are accomplished by utilizing a flexible submarine pipeline which comprises an inflatable flexible shrouding having means for weighting the flexible shrouding attached thereto. The flexible shrouding may be inflated to a semicircular shape having a flat surface secured to the weighting means. The weighting means may comprise a metal plate secured to the flat surface of the semicircular flexible shrouding. A layer of cement or concrete may additionally be attached to the metal plate. The metal plate is fabricated from a grade of steel of sufficient thickness to resist the buoyance of the pipeline and the material transported therein.

The flexible shrouding comprises an elastic material which expands with an increased transportation of materials therethrough. The elastic material may consist of a rubber compound having layers of a resilient cord therein or a resilient plastic. The invention may further comprise a second flexible shrouding secured adjacent to the flat surface of the first flexible shrouding. Weighting means contained within the second flexible shrouding provide further anchoring and buoyancy resistance. The weighting means introduced into the second flexible shrouding are fluid in nature, such as sand or concrete and are poured into the submarine pipeline as it is lowered from the water surface.

The flexible submarine pipeline is of sufficient consistency so as to be capable of being rolled on a spool. The pipeline may be placed on a spool, set on a barge and lowered into the sea by unspooling the pipeline from the barge. The weighting means may be attached at the surface or may be introduced subsequent to lowering the pipeline to the ocean floor as the design criteria may dictate The need for burying the pipeline may be eliminated as the weighting means provide a great deal of stability. In the event of turbulence upon the sea floor the pipeline may be evacuated so as to collapse it, leaving less surface area for contact and thereby reducing the chances of damaging the pipeline. The pipeline has the advantages of being flexible, allowing different volume throughputs and eliminating corrosion problems due to the material makeup of the pipeline.

BRIEF DESCRIPTION OF THE DRAWINGS

The present invention is hereinafter described in further detail with particular reference to the accompanying drawings in which:

FIG. 1 represents a cross-sectional view of a submarine pipeline with solid means for weighting the pipeline.

FIG. 2 represents a cross-sectional view of a submarine pipeline with fluid means for weighting the pipeline.

DETAILED DESCRIPTION OF THE INVENTION

Conventional pipelines consist of circular steel pipe, usually coated with cement for negative buoyancy and corrosive protection. The pipeline of this invention utilizes a flexible shrouding of a material which is corrosion resistant and also yields a flexibility desirable in submarine pipelines. Means for weighting are affixed to the flexible shrouding the addition of a metal plate, cement, sand or a metal plate-cement combination to weight the flexible covering and prevent it from floating in the sea water. The means for weighting provide the necessary buoyancy for laying and stabilizing the pipeline on the ocean floor, while the flexible shrouding represents the walls of the pipeline.

When oil and gas under pressure is conveyed through the flexible shrouding, it will inflate. The amount of inflation will depend upon the ocean depth, the pressure of the material being pipelined and the resiliency of the flexible shrouding. Generally, the density of ocean fluids is approximately 63 pounds per cubic foot, with the pressure increasing with depth at a rate of about 0.435 psi per foot. Therefore, for a given ocean depth of a 100 feet there is required approximately 43.5 pounds of pressure psi to inflate the flexible shrouding, neglecting the resiliency of the shrouding itself. In addition to the force required to inflate the shrouding is the force required to overcome the pressure from around the pipeline resulting from the pressure of the ocean water.

FIG. 1 shows one embodiment of the invention in which a flexible shrouding 101 is affixed to a metal plate 102. As depicted, the shrouding 101 is made of an elastic material such as rubber or resilient plastic containing layers of a resilient material similar to the rubber-nylon arrangement used in automotive tires. The portion of the shrouding 101 that is affixed to the metal plate 102 has extra layers of rubber and cord 105 to provide greater resistance to the drag of the metal plate 102. As depicted, a layer of cement 103 may be attached to the lower portion of the metal plate 102 by pins 104 and wire mesh 107, to attach the cement 103 to the plate 102. The pipeline settles into the ocean floor 106 with a gouging effect so as to form a trough and partially bury the pipeline. The cement 103 exhibits a resistance to the buoyancy of the pipeline. The thickness of cement 103 required may be considerable in order to overcome the tendency of the pipeline to float. The pipeline may be stabilized against ocean currents by placing the shrouding in the collapsed position shown by the dashed line 108. In the deflated position, the pipeline yields greater resistance to current movement and remains stationary.

EXAMPLE

As an example of the construction of the flexible pipeline shown in FIG. 1, the metal plate may be 18 inches wide and have a thickness of one-half inch, thereby having a semicircular pipe with a radius of 9 inches. The downward force per unit length of the pipeline, due to the weight of the metal plate with an average density of 486 pounds per cubic foot, is equal to 30.4 pounds of force per unit length of the pipeline. The downward force per unit length due to the weight of a 53.3 pound per cubic foot density oil flowing within the pipeline is 47.3 pounds force per unit length of pipeline. Through further calculation, the upward force per unit length, due to the buoyant force of the ocean water with an average density of 62.4 pounds per cubic foot, is 55 pounds force per unit length of pipeline. Under these conditions the pipeline filled with oil would not float as it has a total downward negative buoyancy force per unit length of 77.7 pounds versus an upward force per unit length due to the buoyant force of the ocean water of 55 pounds per unit length of pipeline. If gas were being transported within the pipeline there is a reduction in the downward force, due to the reduction in the weight of the fluid transported, this reduction has been reduced some 47.3 pounds per foot. This produces a total upward force of approximately 25 pound force per unit length. The resultant upward force is counterbalanced by the addition of cement 103, as depicted in FIG. 1. The amount of cement required to produce an additional downward force of 25 pounds per unit length, utilizing the average density cement of 130 pounds per cubic foot, would have a thickness of 1.56 inches. One normally would double the cement thickness to about 3 inches for extra negative buoyancy and pipeline stability. By applying a half-inch metal plate with 3 inches of cement attached thereto, the submarine pipeline will not float. The added weight will stabilize the pipeline by entrenching it in the ocean floor, allowing less flexible shrouding exposed to the ocean currents and therefore less abrasive attack and flexing of the pipeline by ocean currents and ocean floor movement.

FIG. 2 illustrates another preferred embodiment of the present invention. In the construction of the pipeline the flexible shrouding 201 has a hard reinforced backing 205 with a second flexible shrouding 203 attached to the flat surface of the reinforced backing 205. The second flexible shrouding 203 is filled with a weighting material 204 to lend additional antibuoyancy to the pipeline. Suitable weighting materials which may be used are sand, gravel or cement, which may be poured into the second flexible shrouding 203 upon construction of the submarine pipeline or by filling in situ after the pipeline has been placed on the ocean floor 206. Therefore, through use of the invention embodiment as depicted in FIG. 2, the metal plate-cement combination of FIG. 1 may be avoided and the flexible shrouding may be more easily handled on the sea's surface.

By adding the weighting material after the pipeline is positioned, the construction is enhanced as one does not have to contend with bulky pipeline materials. Several hundred feet of pipeline may be spooled on land and unspooled at sea, appreciably reducing transportation and construction costs. The pipeline may be more easily positioned as the pipeline benefits from easy construction, handling and stabilization upon the ocean floor. The need for burying the pipeline may be eliminated as the plate or cement provides a great deal of stability. The pipeline flexibility allows divers to maneuver the pipeline subsurface. Hundreds of feet of flexible pipeline may be contained on one spool and many spools may be contained on the barge so that miles of pipeline may be laid within a few days, reducing construction, labor and design problems. When the pipeline is properly positioned and secured, air, water or some other suitable medium may be transported through the pipeline to test the pipeline construction and flexibility. Should any breaks in the pipeline occur they may be easily repaired by patching the flexible shrouding.

As the submarine pipeline does not expose materials which may be corroded by the brine or brackish waters, corrosion problems typical of conventional pipelines are significantly reduced. Many suitable rubbers such as neoprene, butadiene, etc., or plastics having the resilience required by the present invention may be applied. The present invention allows the flow of different fluid volumes through the pipeline without the formation of vapor pockets, reduces corrosion effects usually associated with submarine pipelines, allows a flexible pipeline which may be collapsed during hazardous offshore conditions, and may be easily constructed.

While the invention has been described above with respect to certain embodiments thereof, it will be understood by those skilled in the art that various changes and modifications may be made without departing from the spirit and scope of the invention as set forth herein.

Therefore, I claim:

1. A pipeline for the transportation of both gaseous and liquid materials which comprises:
   a. a semi-circular flexible shrouding having a flat surface; and
   b. means for weighting said semi-circular flexible shrouding secured to the flat surface of the flexible shrouding.

2. The pipeline of claim 1 in which the weighting material is sand.

3. The pipeline of claim 1 in which the weighting material is cement.

4. A pipeline for the transport of both gaseous and liquid materials which comprises:
   a. a first flexible semi-circular shrouding which when inflated exhibits a flat surface thereon its bottom;
   b. a second flexible shrouding secured to the flat surface of the first flexible shrouding; and
   c. a weighting material contained within the second flexible shrouding.

5. A pipeline for the transport of both gaseous and liquid materials having a tendency to float due to the buoyancy of ocean pressure about the pipeline which comprises:
   a. a flexible semi-circular shrouding having a flat surface thereon its bottom; and
   b. a metal plate affixed to the flat of the semi-circular flexible shrouding having sufficient thickness to resist the buoyancy due to the ocean pressure about the pipeline.

6. The pipeline of claim 5 in which the flexible shrouding is an elastic material.

7. The pipeline of claim 6 in which the metal plate is steel.

* * * * *